May 17, 1932. D. C. KLAUSMEYER 1,858,995
DETACHABLE SPINDLE DRIVE AND FEED UNIT
Filed Sept. 4, 1929 3 Sheets-Sheet 3
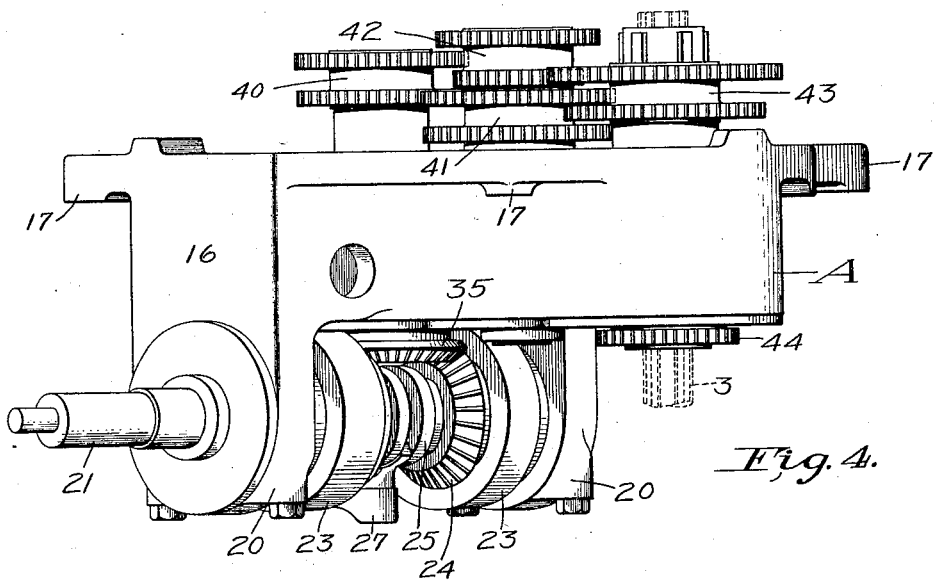
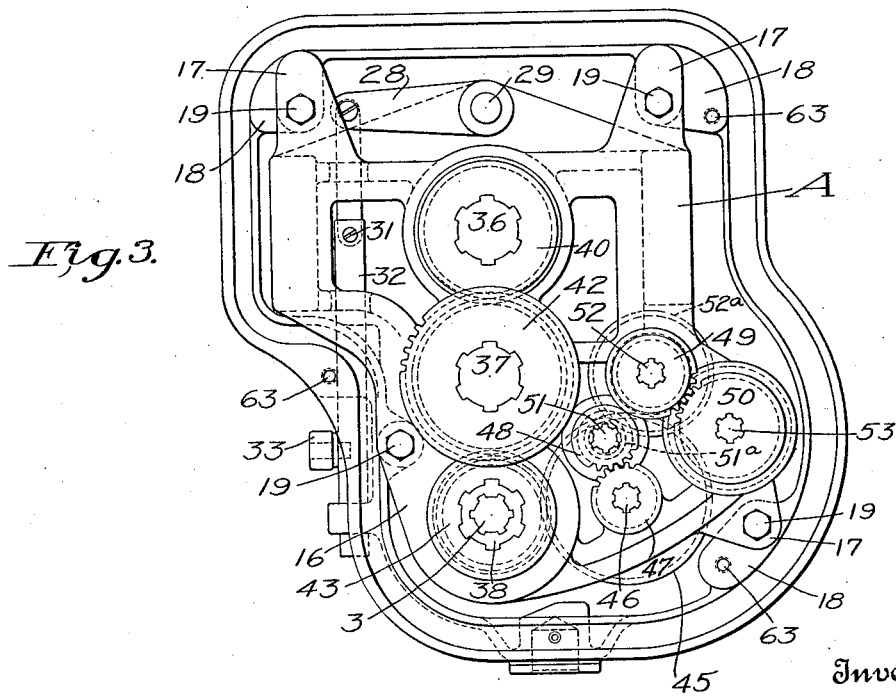

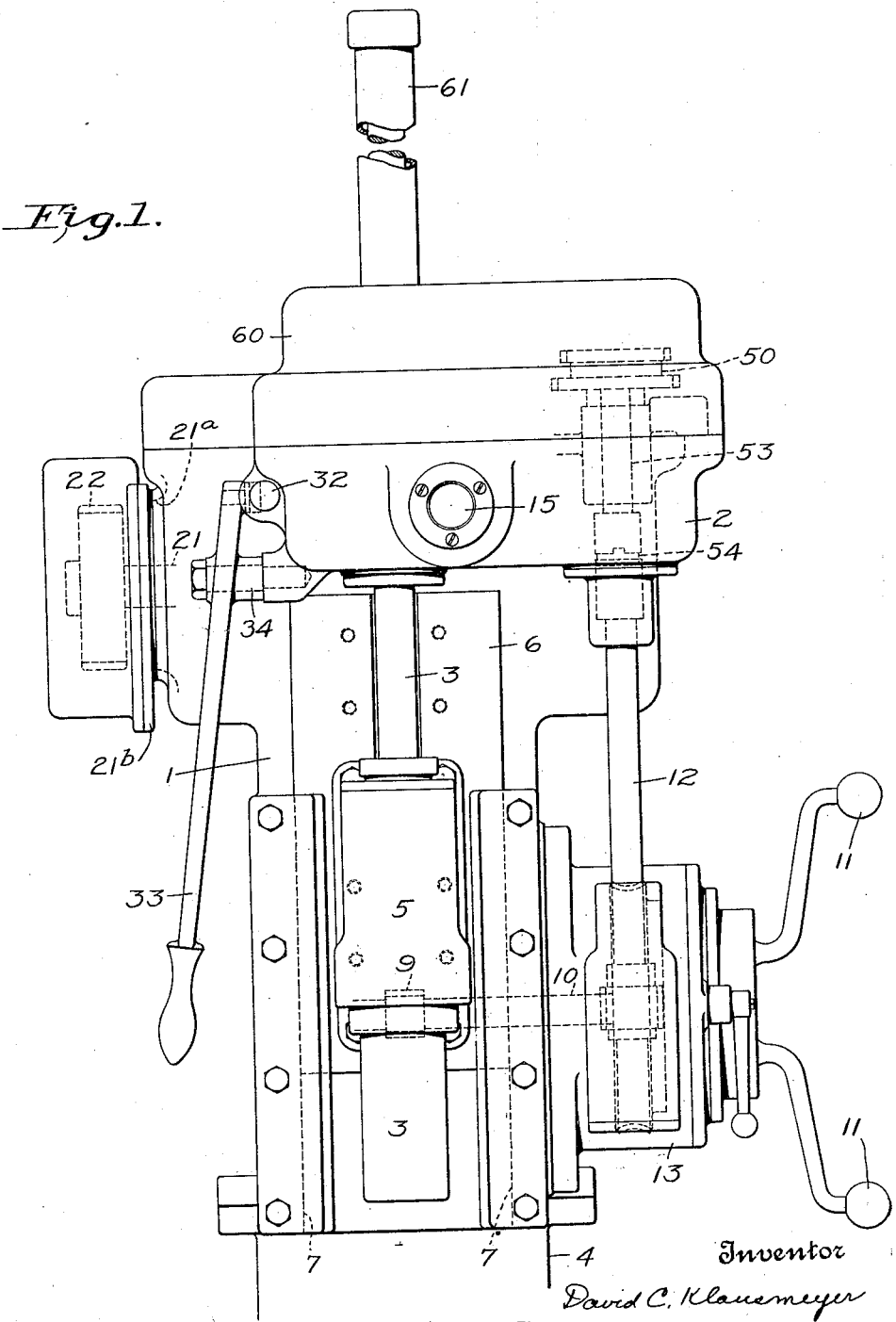

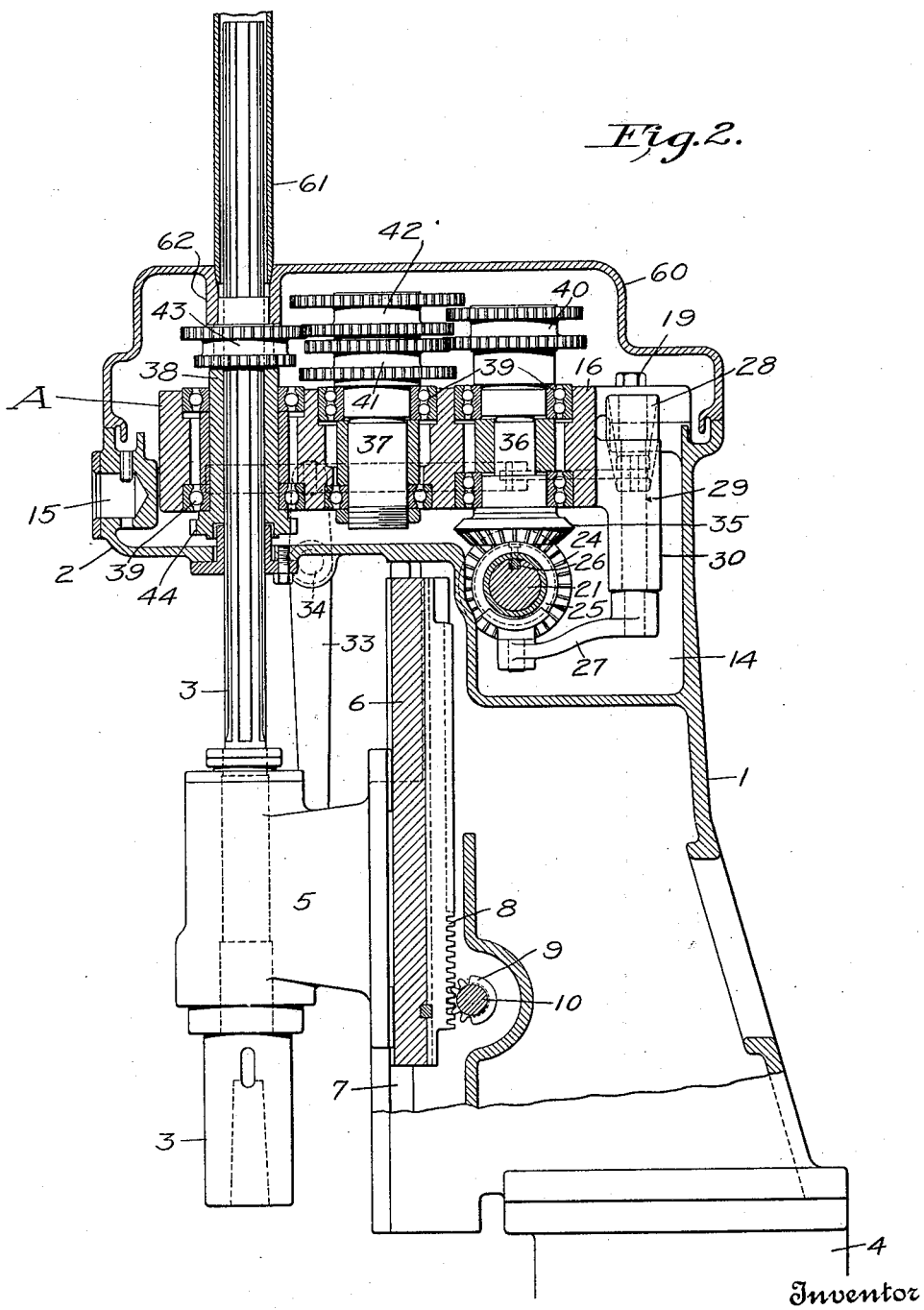

Patented May 17, 1932

1,858,995

UNITED STATES PATENT OFFICE

DAVID C. KLAUSMEYER, OF CINCINNATI, OHIO, ASSIGNOR TO THE CINCINNATI BICKFORD TOOL COMPANY, OF CINCINNATI, OHIO, A CORPORATION OF OHIO

DETACHABLE SPINDLE DRIVE AND FEED UNIT

Application filed September 4, 1929. Serial No. 390,251.

This invention relates to improvements in the art of metal cutting machine tools and is particularly adapted for use in upright drilling and tapping machines.

The demands of automotive and other mass production industries for increased production have resulted in extensive use of the single purpose machine due primarily to its capacity and efficiency when operated on the particular type of work for which it was designed. However, while single purpose machines have many such advantages, they also have their disadvantages, the most serious being lack of flexibility. The machine hereinafter described has all of the advantages of the single purpose machines and in addition the desired flexibility, which enables the user to readily adapt the machine to a plurality of different uses without the usual delay heretofore consumed in changing over from one type of work to another.

When a change of material requires a change in the drilling speed or feed the time consumed in making the necessary spindle speed and feed changes is an important factor in a production shop. In the strictly single purpose machines a quick change cannot be made for the reason that new gears must be built or ordered from the manufacturer, all of which increases the overhead in the shop by allowing a machine to stand idle and occupy valuable floor space.

With this end in view I have designed my improved machine in such a manner as to permit a quick change over from one type of work to another and incorporated in the gear box all of the gears necessary for a range of 16 different speeds and 16 different feeds independent of the speed.

A primary object of my invention is to provide a machine of this type capable of being assembled or disassembled in a unitary manner. Such a construction permits of the simultaneous machining and assembling of the several units, making up the organization, by a group of workmen without interfering with each other. The individual castings are more easily handled, machining costs are materially reduced and inasmuch as similar units are interchangeable with other units, the expense incurred in scrapping a defective part, whether the defect be inherent or caused by defective workmanship, is reduced to a minimum. In a machine thus unitarily designed, each of the component units may be readily demounted for cleaning, repairing, etc., and a new one inserted in a few moments of time. Changeovers from one type of machine to another may similarly be effected without the delays heretofore incurred.

In accordance with this object I have arrived at an organization in upright drilling and tapping machines in which the entire spindle driving and feeding means is mounted in a detachable and removable member whereby the mechanism may be inserted or removed as a unitary structure. The drive unit is thus made readily accessible to the user, as the occasion arises, for whatever repairs may be required, or if necessary a new and complete unit inserted in place thereof. The daily performance of a production machine of this character consequently is not seriously interrupted, while from the manufacturer's standpoint considerable time, labor and expense is saved in so constructing the machine.

A further object of this invention is to construct a machine having an insertable driving unit such that the unit, when inserted, will be entirely enclosed and the moving parts thereof kept free from dust, dirt and other foreign matter which may accidentally fall into the mechanism. The housing for the unit is designed so as to be oil-tight as well as dirt-proof in order that the gears and bearings may run constantly in a bath of lubricating oil.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a front elevation of the upper portion of an upright drilling machine embodying my invention. Fig. 2 is a cross sectional view of Fig. 1 and showing the gear unit completely enclosed. Fig. 3 is a plan view of the unit inserted in the machine and before the cover plate is attached. Fig. 4 represents a perspective view of the driving unit detached from the machine.

Referring more particularly to Figs. 1 and 2 the invention is illustrated as embodied in an upright drill comprising a column member 1 having an enlarged overhanging head portion 2 in which a drill spindle shaft 3 is suitably mounted for rotation and translation. The lower end of the column 1 is adapted to rest upon a suitable column section 4 in the usual manner. The lower column 4 is normally provided with a base member and a work supporting member but inasmuch as they form no part of this invention detailed description and illustration thereof has been thought to be unnecessary.

The lower end of the spindle shaft 3 is rotatably journaled in a translatable head member 5 detachably secured to a sliding plate member 6. The plate 6 is translatably supported on the column 1 as by means of guideways 7, and receives its translatory movements through rack 8, gear 9 and shaft 10 in a known manner. The head 5 being thus made readily removable may be quickly and easily replaced by a head of different design such as one carrying two or more spindles. This is a feature which cooperates with and contributes to the general scheme of a single purpose machine capable of ready convertibility into a single purpose machine adapted for a different specific use. The arrangement, however, of this spindle head has advantages independent from the remaining features described herein and forms the subject matter of a separate application.

The shaft 10 is adapted to be rotated either by hand or power depending upon the character of work to be performed. Hand grasps 11 provide the means for reciprocating the spindle by hand, and shaft 12 provides the power means. The housing 13 incases a conventional form gearing and clutches adapted for this purpose, which, in the interests of simplicity are not disclosed in detail in the drawings and description.

The upper end of the column 1 is provided with the enlarged portion 2 which projects forward of the column and provides suitable journals for the spindle and a housing for an insertable spindle drive and feed unit designated generally as A. The portion of the column forming the housing for the unit A is also provided with a reservoir 14 from which lubricant for the gears and bearings may be pumped or splashed. A glass covered opening 15, formed in the housing 2, provides a means for readily ascertaining if the lubricating system is functioning properly.

The insertable unit A comprises chiefly a main frame or casing 16 of skeleton like construction but strongly reinforced by webs and ribs, scientifically designed and located to give the most strength. This manner of construction eliminates considerable machining expense by decreasing in size and number the parts upon which a tooling operation is necessary.

The unit is provided with projecting flanges or bosses 17, the under sides of which are accurately machined and adapted to rest upon flanges or bosses 18 provided by the housing 2. Bolts 19 and dowels (not shown) secure the unit A to the frame of the machine. In this manner an exceedingly rigid and strong gear box is provided for the various drives now to be described.

Rotatably supported in depending portions 20 of the casing 16 is the main drive shaft 21, one end of which projects through an elongated opening 21ª formed in the housing 2 and carries keyed thereto a driving element 22. The opening 21ª is closed by means of a plate 21ᵇ, bolted to the frame 1, and bored to give an oil seal around the shaft 21.

The forward and reverse driving clutches 23 that comprise the tapping attachment for the machine are mounted upon the main shaft 21, intermediate the depending bearing portions 20 and outside of the bevel gears 24. A clutch spool 25, to which is secured a clutch actuating rod 26, is adapted to be shifted axially upon the shaft 20 by a shifting arm 27. The arm 27 and arm 28 are secured to opposite ends of a short shaft 29 journaled in a bearing 30 provided by the casing 16. The free end of the lever 28 is detachably linked at 31 to a slide rod 32 to which is secured one end of a shifting lever 33. Thus, movement of the lever 33 in one direction about its pivot 34, imparts a movement to slide rod 31 and which, through lever 28, shaft 29, lever 27, and spool 25, actuates the rod 26 to cause one of the clutches 23 to become effective to drive the bevel gear 35 forwardly. The reverse movement of the gear 35 is accomplished by moving the lever 33 in the opposite direction.

The spindle driving mechanism comprises two vertical shafts 36 and 37 respectively and one tubular shaft 38, each of which is mounted in anti-friction bearings 39 fitted in recesses provided by the casing 16. The spindle driving gear train comprises two sets of cluster gear speed change units. The first or primary set, constituting gear units 40 and 41 are splined and interchangeably fitted to shafts 36 and 37. The secondary speed change set, constituting cluster gear units 42 and 43 are also splined and interchangeably fitted to shafts 37 and 38. The cluster gear units of each set are made up of two gears each and which are interchangeable on their respective shafts and adapted to be positioned with either gear up or down in order to give any particular speed to the spindle out of the sixteen combinations obtainable.

The center distances between the primary and the secondary shafts are of unequal dimensions, thus insuring that the pair of cluster gears having the greatest differences in ratio are next to the driven shaft or spindle, and the pair of cluster gears having finer graduations of speed, commonly known as back-gears, are on the primary shafts.

The lower end of the tubular shaft 38 is provided with a gear 44 from which the power feed is taken. The feed train comprises a gear 45 on the lower end of shaft 46 meshing with the gear 44; cluster gear units 47 and 48, gears 51$^a$ and 52$^a$, and cluster gear units 49 and 50. Shafts 51 and 52 are connected on the under side by the gears 51$^a$ and 52$^a$ mentioned above.

The cluster gear units 47 and 48 are splined and interchangeably fitted to shafts 46 and 51, and cluster gear units 49 and 50 are likewise splined and interchangeably fitted to shafts 52 and 53. The cluster gear units may be variously positioned upon the shafts of their respective sets to give any one of a range of sixteen feeds in a manner similar to the drive train for rotating the spindle. As illustrated in Fig. 1 a flexible coupling 54, such as the well known Oldham coupling, connects the shaft 53 with the feed shaft 12 heretofore mentioned.

The entire spindle driving and feeding mechanism is protected against dirt, grit, leakage of lubricant, etc. by means of the cover plate 60 through which the upper end of the spindle shaft 3 projects. The shaft 3 is likewise protected by means of a closed sleeve 61 which is secured to the cover plate 60 and removable therewith. The cover plate also provides a depending portion 62, machined to clear the sleeve or tubular shaft 38, which acts as a guard to prevent the lubricant from escaping down the spindle shaft 3. Suitable bolts (not shown) entering tapped holes 63 in the head portion 2 secure the cover plate to the head portion.

The unit A may readily be removed from the machine for inspection, repairs, etc. by first removing the cover plate and then withdrawing the bolts 19. After disconnecting the link at 31 the entire and complete mechanism may be tilted until the driving element 22 clears the opening 21$^a$ and then lifted clear of the machine, and, if desired, replaced by a different and complete unit. However, where only speed or feed changes are required to be made to suit a particular class of work at hand, the cover plate alone is removed permitting ready access to the cluster gears which may then be transposed or inverted as heretofore explained.

This it will be seen that a machine unitarily constructed in the manner herein set forth has all the advantages of a general-purpose machine without its complex mechanisms and all the advantages of a single-purpose machine, plus flexibility. Quick change-overs from one type of single-purpose machine to machines of totally different character, may be affected without delay and its continual daily performance uninterrupted.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the general or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. An upright drilling machine combining a column; a closed transmission housing at the upper end thereof having a removable cover; a unitary transmission assembly removably mounted in said housing; a drill spindle shaft extending into said housing; a spindle feed head mounted on said column and supporting the lower end of said spindle shaft; feed mechanism therefor; a power driven shaft in said housing; a gear train including pick-off change speed gears mounted in said housing for rotating said spindle from said power driven shaft; and a gear train mounted in said housing having an operative connection to said feeding mechanism including pick-off change speed gears mounted in said housing for independently varying the rate of feed, said spindle rotating and feeding gear trains being embodied in and forming part of said removably mounted transmission assembly.

2. An upright drilling machine combining a column having a closed transmission head comprising a chamber and a removable cover fitted thereto; a drill spindle shaft extending through said head; a unitary transmission assembly removably mounted in said transmission head and adapted, after removal of said cover, to be removed from said chamber as a unit, said unitary transmission assembly comprising a frame having depending portions; a driving shaft journaled in said depending portions and having one end projecting therefrom; a driven shaft journaled in said frame transverse to said driving shaft; a gear connection between said driving and driven shafts; reversing means on said driving shaft for reversing the direction of rotation of said driven shaft; a system of gears arranged at the upper side of said frame and connecting said driven shaft with said spindle shaft for rotating the latter; and other gears, also at the upper side of said frame, connecting said spindle with feed means therefor for effecting axial movements of said spindle.

3. An upright drilling machine combining a column; a closed transmission housing at the upper end thereof having a removable cover; a unitary transmission assembly removably mounted in said housing; a drill spindle shaft extending into said housing; feeding mechanism therefor; a power driven shaft in said housing; gear trains including two sets of pick-off change speed gears mounted in said housing for rotating and feeding said spindle shaft from said power shaft; and means to prevent the transposing of the gears of the said gear trains, said spindle rotating and feeding gear trains being embodied in and forming part of said removably mounted transmission assembly.

In witness whereof, I have hereunto subscribed my name.

DAVID C. KLAUSMEYER.